United States Patent [19]

Young

[11] Patent Number: 4,682,957
[45] Date of Patent: Jul. 28, 1987

[54] TELECONFERENCING AND TEACHING METHOD AND APPARATUS

[76] Inventor: Gordon W. Young, P.O. Box 8551, Salt Lake City, Utah 84108

[21] Appl. No.: 832,358

[22] Filed: Feb. 24, 1986

[51] Int. Cl.$^4$ ............................................. G09B 5/10
[52] U.S. Cl. ............................. 434/307; 340/825.48; 379/77; 379/102
[58] Field of Search ................ 434/307; 340/825.68, 340/825.69, 825.48; 179/2 A, 37, 41 A, 6.01, 6.11

[56] References Cited

U.S. PATENT DOCUMENTS

| | | | |
|---|---|---|---|
| 3,597,543 | 8/1971 | Mallebrein | 179/2 A |
| 3,725,589 | 4/1973 | Golden | 179/2 A |
| 4,313,135 | 1/1982 | Cooper . | |
| 4,321,625 | 3/1982 | Smith . | |
| 4,342,986 | 8/1982 | Buskirk et al. . | |
| 4,360,827 | 11/1982 | Braun . | |
| 4,403,119 | 9/1983 | Conklin et al. . | |
| 4,426,555 | 1/1984 | Underkoffler . | |
| 4,431,872 | 2/1984 | Edwards et al. . | |
| 4,500,752 | 2/1985 | Lee . | |
| 4,516,156 | 5/1985 | Fabris et al. . | |
| 4,518,989 | 5/1985 | Yabiki et al. . | |

FOREIGN PATENT DOCUMENTS

2345872  11/1977  France .

*Primary Examiner*—Leo P. Picard
*Attorney, Agent, or Firm*—Robert R. Mallinckrodt; Philip A. Mallinckrodt

[57] ABSTRACT

A live presentation utilizing quality visual or audio supporting material may be given at at least one remote location from an originating location by use of standard voice grade telephone serivce by preparing a package of supporting material and transmitting such supporting material in advance of the presentation to the remote location. Such transmission may be, for example, by mail, courier, or nonrealtime electronic transmission. Presenting equipment is located at the remote location and at the time of the presentation, the originating and remote locations are connected via standard voice grade telephone service so that the oral presentation is transmitted from the originating location to the remote location via the telephone service and during the presentation, the presentor at the originating location controls the presentation of the supporting material at the remote location by controlling operation of the presenting device with control signals generated as desired by the presentor at the originating location and transmitted via the standard telephone service to the remote location. For example, if the supporting material are slides, the operation of the slide projector at the remote location is controlled by control signals generated by the presentor at the originating location to advance or back up the slides as the presentation is made in the same manner as if the presentor were actually present at the remote location.

20 Claims, 9 Drawing Figures

TELECONFERENCING AND TEACHING METHOD AND APPARATUS

BACKGROUND OF THE INVENTION

1. Field

The invention is in the field of communication systems, and more particularly communications systems for use in teleconferencing and teaching presentations which utilize supporting materials which can be prepared ahead of the presentation.

2. State of the Art

Most classroom and other presentations to groups are made by a speaker actually being present before the group to give the presentation and in many cases to present supporting material for the presentation. The supporting material may be visual material such as slides, movies, or video material, computer demonstrations, or even high fidelity audio material. When groups desire to have a presentation made by a person who lives in an area remote from where the presentation is to be made, it becomes expensive to transport the person to the location of the presentation and, in many instances, to provide lodging for the person. Many groups would like to have various speakers but because of the costs involved, cannot afford to do so. Further, many professors would like to have guest lecturers for their classes, but again, because of cost, cannot afford to bring in the guest lecturers.

While speakers phones exist and a presentation to a group can be made by telephone, such procedure does not allow use by the speaker of supporting material to illustrate or otherwise support the presentation and has not been accepted as a viable substitute for a live presentation.

Video tape presentations are not the equivalent of live presentations and allow no audience participation. Live presentations utilizing television transmissions, closed circuit or otherwise, require special studios and expensive transmitting and receiving equipment.

Providing visual as well as audio information live at remote locations in a manner similar to providing audio information by means of a telephone has been desireable since the development of telecommunications. As technology advanced, various forms of video transmission for teleconferencing have developed utilizing microwave links, satellite transmission, and more recently, specialized wide band digital telephone lines which allow digitized images, both still and moving, to be transmitted and received on appropriate equipment. Such systems are described in "Picture Phones Get a New Image", by Wesley R. Iversen in "Electronics", Aug. 19, 1985. The major stumbling block to live video transmission for teleconferencing is the fact that even with innovative signal processing, the large amount of information which must be transmitted for visual images has always precluded the use of standard "voice grade" telephone lines for satisfactory picture transmission, since the bandwidth of these lines is severely limited. This, in turn, has prevented the development of a widespread video network for teleconferencing using telephone lines as the present world telephone system is not able to provide the necessary wide band links from all possible sending location to all possible receiving locations, nor does it appear that this will be the case in the foreseeable future. In order to provide viable visual teleconferencing using the existing world telephone system, a means is needed whereby a high quality visual presentation may be made over existing telephone lines.

SUMMARY OF THE INVENTION

According to the invention, high quality supporting material, such as high quality visual material produced by projecting slides or by operating a video recorder, is provided as part of a telephone presentation using standard voice grade telephone service. The supporting material is prepared in advance and sent to the remote location where the presentation is to be made. At the appropriate time, the presentation is made via standard telephone service by a presentor at the originating location and during the presentation, the presentor operates a presenting device, such as a slide projector, at the remote location by signals also transmitted from the originating location to the remote location via standard telephone service. In this manner a live presentation can be made and high quality visual or other supporting material can be incorporated into the presentation. For example, with a slide projector, the presentor can change slides, go back to slides already projected and basically operate the slide projector or other supporting devices in the same manner as if he was actually at the remote location.

While communication in one direction from the originating location to the remote location can be used, it is preferred, and one advantage of the invention is, that two way communication with the telephone service be utilized so that questions and comments from the audience at the remote location are transmitted to and can be answered by the presentor as if he were actually present at the remote location.

The invention includes a package of supporting material for a presentation that is prepared in advance of the presentation and sent to the remote location where the presentation is to be made. The supporting material may take the form of slides, filmstrips, microfiche, movies, videotapes, videodiscs, machine readable materials such as floppy discs, or high fidelity sound recordings. The material may be sent to the remote location by mail, courier, or non-real time electronic transmission. A device for presenting the supporting material is located at the remote location where the presentation is to be made, and may take the form of a projector, video player with monitor, computer, or tape player. At the time of the presentation, the presentor makes his oral presentation at the originating location with means at the originating location for producing signals representative of such audio presentation and for transmitting such signals to the remote location using the standard telephone service. In most cases, this means will be standard telephone equipment in the form of a standard telephone with the presentor speaking into the normal telephone handset receiver or a microphone which picks up the sound in the originating location, converts it to electrical signals and transmits the signals by standard telephone service. Also located at the originating location is means for producing control signals representative of the desired operation of the presenting device and for transmitting such signals by the standard telephone service to the remote location. In most cases, this means will be the standard "touchtone" dialer provided with standard "touchtone" telephones or a separate tone generator, either of which is operated by the presentor to produce control signals which are transmitted by the standard telephone service so as to control the presenting device at the remote location. These control signals will generally be transmitted over the same telephone connection as the audio signals.

At the remote receiving location, means are provided to receive the audio telephone transmission and produce audio signals that can be heard at the remote location. Again, this means can be standard telephone equipment such as a speaker phone, or preferably, will include an additional amplifier and speaker system. Means is also provided at the remote location to receive the control signals from the telephone service and operate the presenting device in response to such signals. When the audio and control signals are sent over the same telephone line, means is provided at the remote location for dividing the audio and control signals.

If desired, a package of supporting material and a presenting device may also be operated at the originating location in response to the control signals transmitted to the remote location so that the presentor sees the supporting material as presented at the remote location.

The method of the invention includes the steps of preparing supporting material for a presentation in advance of the presentation, sensing the supporting material to the remote location, making the presentation using standard telephone service, and controlling presentation of the supporting material during the presentation by control signals sent to the remote location using standard telephone service.

THE DRAWINGS

In the accompanying drawings, which illustrate the best mode presently contemplated for carrying out the invention.

DETAILED DESCRIPTION OF THE ILLUSTRATED EMBODIMENT

Figure 1:
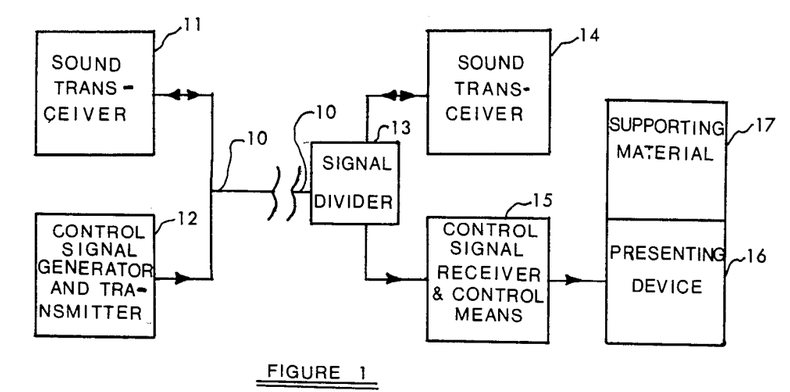
FIG. 1 is a block diagram of the basic blocks comprising the invention.

FIG. 1 shows a basic block diagram of a preferred apparatus of the invention. The two blocks to the left of the break in line 10 indicate apparatus located at the originating location of the teleconference presentation and the blocks to the right of the break indicate apparatus at the remote location. As shown, a sound transceiver 11 is located at the originating location to pickup the audio presentation being made at the originating location, convert it to electrical signals and transmit such signals via a standard voice grade telephone line 10 to a remote location. Block 11 provides a means at the originating location for producing signals representative of the audio presentation made at the originating location and for transmitting such signals by the standard telephone service to at least one remote location. Block 11 is labeled "sound transceiver" because in the preferred embodiment of the invention, it not only transmits signals to the remote location, but also receives signals from the remote location via the standard telephone service and produces corresponding audio signals at the originating location. Also located at the originating location is a means 12 for producing control signals representative of the desired operation of a presenting device located at the remote location and for transmitting such signals by standard telephone line 10 to the remote location. This block is labeled "control signal generator and transmitter".

Telephone line 10 represents the standard voice grade telephone service available substantially throughout the world and does not necessarily represent a wire connection since telephone service in many instances is provided by microwave transmissions, fiber optic transmissions, or other forms of transmission.

In the preferred embodiment, a signal divider 13 at the remote location separates the control signals from the signals representative of the audio presentation which may be referred to as the audio signals. A sound transceiver 14 at the remote location provides the means for receiving the audio signals representative of the audio presentation from the telephone service and converting such signals to audio sound that can be heard at the remote location. Again this block is labeled as a "transceiver" because it is preferred that in addition to receiving the signals from the originating location, it can also convert audio signals at the remote location into signals for transmission back to the originating location. Thus, blocks 11 and 14 provide basic two way telephone communication between the originating location and the remote location. The control signals from the signal divider 13 are sent to a means for receiving the signals representative of the desired operation of the presenting device and for operating the device in response to the control signals. This is block 15 labeled "control signal receiver and control means." This block receives the control signals as generated by block 12 and controls the presenting device, block 16. The presenting device presents the supporting material, block 17, in response to the control signals produced by block 12.

Figures 2, 3:
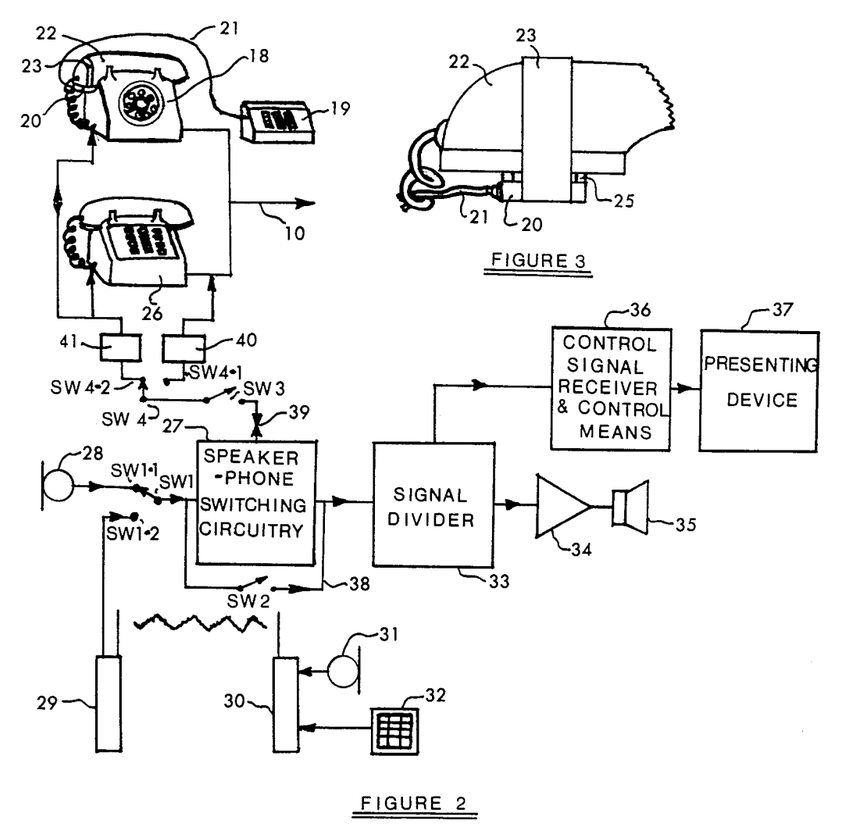
FIG. 2 a combination schematic and block diagram showing an embodiment of the invention for use at the originating location.
FIG. 3, a fragmentary enlargement of the microphone portion of the handset as shown in FIG. 2.

FIG. 2 is a representation of equipment that can be used at the originating location in a preferred embodiment of the invention.

The sound transceiver, block 11 of FIG. 1, may take the form of a conventional rotary dial telephone 18. When using such a telephone, the control signal generator and transmitter 12, FIG. 1, may take the form of a standard portable dual tone multifrequency (DTMF) tone encoder as is used for nationwide long distance service access. In the preferred embodiment shown, this encoder is broken down into two portions, a keyboard portion 19 which can be placed conveniently on a desk or table and a sound transducer 20 connected to the keyboard portion 19 by wire 21. Transducer 20 is attached to the telephone handset mouthpiece 22, FIGS. 2 and 3, by means of an elastic strap 23. Transducer 20 is held in position spaced from the surface of mouthpiece 22 by a spacing ring 25, to enable the receiver to pick up the voice of the presentor as well as the tones generated by the transducer. Thus, a presentation can be made from any location having a conventional telephone and the only additional equipment needed is a tone encoder.

Rather than using a rotary dial telephone and separate portable tone encoder, both the sound transceiver and the control signal generator can be combined into a single unit in the form of a standard "touchtone" telephone 26. Thus, if a "touchtone" telephone is available, the presentation can be made without any additional equipment at the originating location.

When using a standard rotary dial telephone and encoder or a "touchtone" telephone, the telephone is connected directly to telephone service line 10 in normal manner. The presentor makes his oral presentation by talking into the telephone handset and controls the presenting device for the supporting material by pushing the buttons on the "touchtone" telephone or the buttons on portion 19 of the tone generator.

The additional equipment shown in FIG. 2 can be used with either of the standard telephones shown and is preferred when a group presentation is being made at the originating location as well as the remote locations, or when the presentor at the originating location wishes to simulate the presentation as actually presented at the remote location.

A set of standard speakerphone switching circuitry chips, such as those made by Motorola or Cherry Semiconductor and designated MC 34018 and CS262 respectively, and represented in FIG. 2 by block 27, provide switching circuitry for accepting input signals from a microphone and directing those to the telephone line for transmission to the remote location or directing output signals received from a remote location via the telephone line to a speaker. It should be noted that these chips are normally used as the basis of a standard speakerphone and form the switching circuitry for such phone. The input signals may come from either a standard microphone 28 or the receiver unit 29 of an FM wireless microphone having a transmitting microphone unit 30 as well as receiving unit 29. Microphone transmitter 30 has both an audio input through microphone 31 and a DTMF tone generator 32. In operation, when the wireless microphone is used a presentor may press a button or buttons on the wireless microphone transmitter to transmit tone control signals to the receiver unit 29 and then to the speakerphone circuitry 27. The presentor has complete control of the system. Switch SW1 is used to select either the standard microphone input or the wireless microphone input through switch poles SW1-1 or SW1-2 respectively. When standard microphone 28 is used, the control signals are produced by the keyboard of touchtone phone 26 or tone generator 19, whichever is available.

The wireless microphone unit is particularly useful when the presentor desires to move around during the presentation. The speakerphone circuitry 27 may be either simplex or duplex speakerphone circuitry and is well known.

As indicated, this additional circuitry may be used when a presentation is being made at the originating location as well as at the remote location, or merely when the presentor desires to simulate the presentation as given at the remote location. In such instances, the presentation being made will usually be amplified for presentation at the originating location and a presenting device similar to that located at the remote location along with similiar supporting material will be present at the originating location. If duplex speakerphone circuitry is used, the output of the speakerphone circuitry 27, which includes the input signals from the selected microphone and the control signals however generated, is fed to signal divider circuitry represented by block 33. This circuitry separates the control signals from the audio signals so that the audience does not have to listen to the control tones each time they are transmitted. This separation is not necessary but is preferred because it gives a nicer audio presentation. The signal dividing circuitry is shown in more detail in FIGS. 5 and 6. The audio signals minus the control tones are sent from the signal divider to an audio amplifier 34 and then to a loudspeaker 35. The control signals are sent to control signal receiver and control means 36 which controls operation of a presenting device 37 similar to the presenting device at the remote location. If simplex speakerphone circuitry is used, it is necessary to bypass speakerphone circuitry 27 by wire 38 in order to provide the audio signals to the signal divider circuitry and amplifier. This bypass is necessary because with simplex speakerphone circuitry, signals on the input line do not appear on the output line. This avoids feedback in the telephone circuitry. With bypass 38, the signals on the input line are fed directly to the signal divider circuitry. Switch SW2 allows the bypass 38 to be connected or disconnected as desired. Even when using the bypass 38, the input signals are also fed to speakerphone circuitry 27 for transmission to the remote location. If the wireless microphone 30 is used, the control signals pass through circuitry 27 or bypass 38 along with the audio signals, or if microphone 28 is used, the control signals are generated by either "touchtone" telephone 26 or tone generator 19 and enter speakerphone circuitry 27 as incoming telephone signals are directed to circuitry 33. Any other incoming telephone signals are likewise directed to circuitry 33. In some instances, it may be desireable to verify control signals received at remote locations and in such instances signals sent from the originating location to the remote location are sent back to the originating location to operate the control means. If a feedback arrangement is used, the control signals will be modified at the remote location so as to be distinguishable from the originally transmitted control signals and the control circuitry of block 36 will be set to operate the presenting device in response to the modified feedback control signals rather than the original control signals.

The telephone line connection 39 of the speakerphone circuitry is connected through switch SW3 to switch SW4. Switch SW4 allows the speakerphone telephone line connection 39 to be connected directly to telephone line 10 through switch pole SW4-1 or to the telephone handset connection of either the rotary dial phone 18 or touchtone phone 26 when connected to pole SW4-2. This allows any conventional telephone to be used to make the initial telephone connection to the remote location, and then the speakerphone circuitry to be connected directly to the phone line 10 for operational use. The connection through pole SW4-2 to the telephone ouput at the handset connection is particularly useful with the many models of noncompatible telephones which are now on the market using digital technology. When the line 39 is connected directly to telephone line 10, interface circuitry 40 is used to provide the normal telephone circuitry needed in addition to the speakerphone circuitry of block 27 to receive and transmit signals over the telephone line. If line 39 is connected to the handset connection, the additional telephone circuitry is not needed, but in some cases, interface circuitry 41 is needed to match signal levels in the lines. Switch SW3 disconnects speakerphone circuitry 27 from the phone line and is needed when connected directly to phone line 10 in order to "hang up" the speaker phone circuitry.

Rather than direct connection of the speakerphone circuitry to the telephone line or to telephones 18 or 26 as shown, the speakerphone circuitry may be connected to a telephone via an acoustic coupler such as used for computer modems. This mode of operation is useful for foreign or other telephones with non detachable cords or which are not compatible with United States standards.

In operation, with switch SW4 positioned to connect line 39 directly to line 10, before a telephone connection is made between the originating and remote location, the handset of either telephone 18 or 26 is down and switch SW3 is open. The handset of the telephone used is picked up and the telephone number of the remote location dialed in normal manner. When answered at the remote location, the telephone link has been made and switch SW3 is closed to connect speakerphone circuitry 27 to the line. If the wireless microphone having its own control signal generator is used, the handset of the telephone may be "hung-up." Otherwise, it should remain "off the hook." When the presentation is completed, switch SW3 must be opened and the handset placed on the telephone to disconnect telephone line 10. If switch SW4 is positioned to connect line 39 to the handset connection of the telephone, the normal handset will usually be disconnected from the telephone so that the connection to interfere circuitry 41 can be made in place of the connection to the handset. If desired, however, the handset may remain connected and a parallel wire connection made to interface circuitry 41. If a rotary dial phone 18 is used and the tone generator 19 is required, the handset has to remain plugged into the telephone and a parallel wire connection to interface circuitry 41 is necessary. In either case, when not in use, the handset must be left "hung up" on the phone in order to disconnect it from the line. For use, the handset is lifted off the telephone and the number dialed to the remote location. Switch SW3 may be either open or closed. When the remote location answers the call, the connection is made and if switch SW3 has been open, it is closed to connect circuitry 27 to the line. When the presentation is completed, the handset is replaced on the phone to disconnect line 10. With the speakerphone circuitry connected to the handset line, switch SW3 is not necessary or may be left closed at all times because both the telephone and the speakerphone circuitry is disconnected from line 10 by the switch in the telephone opened by "hanging up" the handset.

Telephone line 10 is a standard voice grade communications channel connecting the transmitting location with the receiving location. This may be any telephone connection in the world no matter its technical specifications or construction so long as it transmits the human voice.

Figure 4:
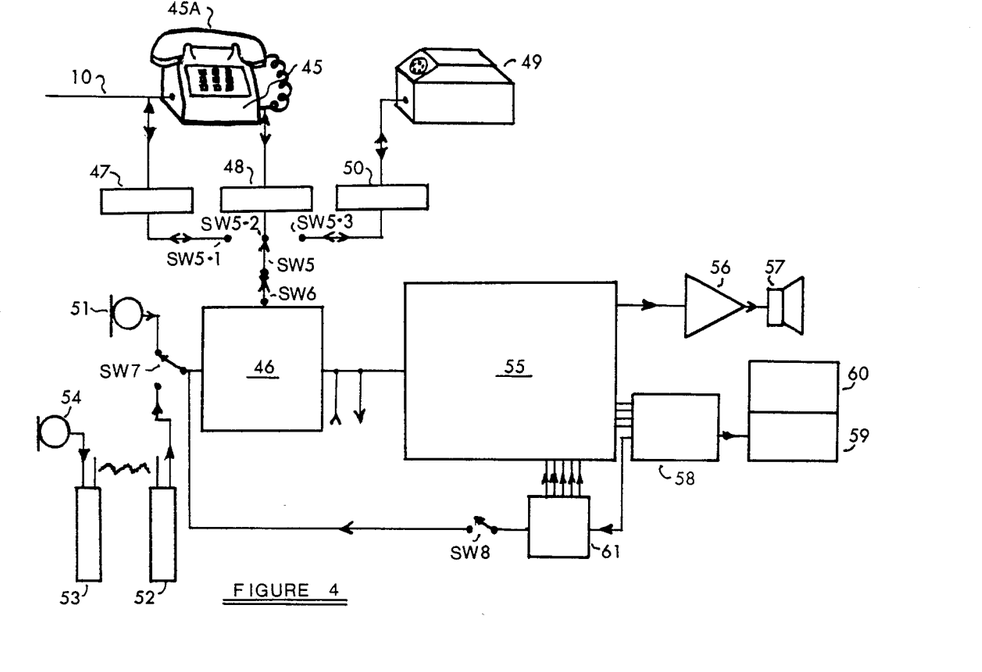
FIG. 4, a combination schematic and block diagram showing an embodiment of the invention for use at the remote location.

FIG. 4 shows the equipment at the remote location for an embodiment of the invention. The telephone connection to line 10 may be made by any conventional telephone 45 of whatever type. Once the call is received so the telephone connection is made with the originating location, standard speakerphone circuitry 46 as described above in connection with block 27, FIG. 2, may be connected to line 10 through telephone circuitry 47, pole SW5-1 of switch SW5, and switch SW6, or may be connected to the handset output of the telephone through signal matching circuitry 48, switch pole SW5-2, and switch SW6. The direct connection will preferably be made for conventional analog Bell System compatible lines. In the case of digital PBX units where the standard analog telephone signals are not present, the unit will preferably be connected to the handset connection in order to obtain the necessary analog signals for the speaker phone circuitry as easily as possible. In the event the telephone system is totally incompatible with any conventional system, an acoustic coupler 49 similar to those used in old computer modems may be used. In such case, the handset 45a of telephone 45 is placed on the coupler and signals from the coupler are sent to speakerphone circuitry 46 through signal matching circuitry 50, switch pole SW5-3, and switch SW6. As with the speakerphone circuitry of FIG. 2, the input to speakerphone circuitry 46 may be either a conventional microphone 51 or a wireless microphone receiver 52 with wireless microphone transmitter 53 and microphone 54. The standard microphone or wireless microphone are selected through switch SW7. This arrangement allows replies from the remote location to the originating location to be easily provided in either large or small audiences.

Output from speakerphone circuitry 46 is sent to signal divider circuitry 55 which separates the DTMF control tones from the audio signals. The audio signals are sent to amplifier 56 and speaker 57. The control signals are sent to the control signal receiver and control means 58 which controls operation of presenting device 59 to present supporting material from the package of supporting material 60.

Where it is desired to provide feedback control signals to the originating location so that operation of the remote presenting means is accurately monitored at the originating location, the control signals are also provided to feedback control circuitry 61 which is connected through switch SW8 to the speakerphone circuitry input in electrical parallel with microphone 51 or 52. Feedback circuitry 61 takes the control signals and reencodes them to tone frequencies different than the original frequencies and then supplies these tone signals to the input of speakerphone circuitry 46 to be transmitted back to the originating location. Switch SW8 is used to selectively connect or disconnect feedback circuitry 61 to the input of speakerphone circuitry 46. Feedback circuitry 61 reencodes the control signals using different frequencies then the original control tones so that the feedback signals can be differentiated from the original control signals.

Figure 5:
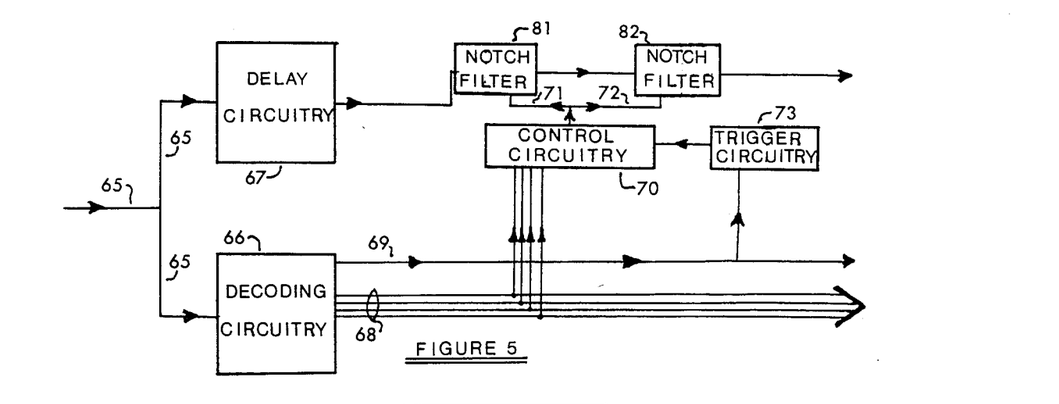
FIG. 5, a block diagram showing details of one embodiment of the signal divider circuitry.

FIG. 5 shows in more detail one embodiment of signal divider circuitry that can be used in blocks 33 of FIG. 2 and 55 of FIG. 4. The output of the speakerphone circuitry enters the signal divider circuitry on line 65, and is sent to both a standard bell "touchtone" compatible decoding circuit 66 and to a serial analog delay line 67 such as a model R5106 delay line made by Reticon Corporation. The output of decoding circuit 66 is a four bit binary word representing sixteen possible states, these sixteen states represent the decimal numbers 0-9 and letters A-F. These signals are supplied by parallel output lines 68. These output signals are accompanied by an output signal on line 69 which indicates that the binary output on lines 68 is valid for control purposes and may be used to control the presenting means. With the standard decoding circuitry, it takes about thirty milliseconds to determine if a tone is a valid DTMF tone and to so indicate on the "valid tone" line 69. Normal audio signals on the telephone line would not produce a signal on the valid tone line 69.

The delay circuitry output delays the input signal on line 65 for at least the time required for the decoding circuitry to determine if a valid control signal is present, and preferably for slightly longer. Where it takes the decoding circuitry thirty milliseconds to determine if a control tone is present, it is preferred that the delay circuitry delay its input signal by forty milliseconds.

The output of delay circuitry 67 passes through programable notch filters 81 and 82 connected electrically in series with the output of delay circuitry 67. Each programmable notch filter will filter out a certain frequency from the signal passing through the filter and are programmed or set to the frequency they filter out by an input signal fed to them. In the embodiment shown, the programmable notch filters may be switched capacitor active filters such as Reticon Model R5620. The output of notch filter 82 is connected to the audio amplifier such as 34 in FIG. 2 or 56 in FIG. 4.

The output of the decoding circuitry on line 68 is connected to the control signal receiver and control means, 36 in FIG. 2 and 58 in FIG. 4, and is also connected to filter control circuitry 70. Filter control circuitry 70 may take the form of standard DTMF tone generators operated in a single tone mode so that with the decoded signal from decoding circuitry 66 supplied to filter control circuitry 70 through lines 68, the control circuitry will generate one of the dual frequencies and send it via line 71 to notch filter 81 and will generate the other one of the dual frequencies and send it via line 72 to notch filter 82. These frequencies are the control signals for the notch filters and represent the frequencies filtered out of a signal passing through the filters. The filter control circuitry will only send signals to the filters if the circuitry is activated by an enable signal from trigger circuitry 73, and once triggered, will continue to send the same signals to the filter until the enable signal ends. The "valid tone" signal on line 69 from the decoding circuitry 66 is connected through line 69 to the control signal receiver and control means and is also sent to trigger circuitry 73. Trigger circuitry 73 sends an enable signal to the filter control circuitry upon a valid tone signal on line 69, and continues sending such enable signal for a period at least equal to the delay of delay circuitry 67, here forty milliseconds, after the valid tone signal on line 69 stops. The trigger circuitry may be a retriggerable one shot such as a standard NE 555 timer and set in standard fashion for a forty millisecond delay.

In operation, the signals from the telephone line are received and directed by the speakerphone circuitry via line 65 to decoding circuitry 66 and delay circuitry 67. The signals pass through the delay circuitry 67, filters 81 and 82, to the audio amplifier. When a control signal is present on the line, it is decoded in the decoding circuitry and after the thirty milliseconds required for the decoding circuitry to recognize a valid control tone, a signal appears on the valid tone line 69. This valid tone signal causes the trigger circuitry to produce an ouput to enable the filter control circuitry to send the tone signals to the filters 81 and 82 representative of the control signal. Thus, the filters are set to filter out the control signal within thirty milliseconds of the signal reaching the decoding circuitry and the delay circuitry. Since the delay circuitry is set to delay the incoming signal by forty milliseconds, when the control signal emerges as part of the signal from the delay circuitry and passes through the filters, the filters have already been set and the control signal is filtered out while the remaining audio signals, if any, are passed through to the amplifier. When the control signal ends, the signal on valid tone line 69 ends almost immediately, but the trigger circuitry continues to cause the filter control circuitry to operate the notch filters for an additional forty milliseconds to continue to filter out the control signal which has been delayed through delay circuitry 67 by forty milliseconds. Thus, the control signal is completely eliminated from the audio signal.

Figure 6:
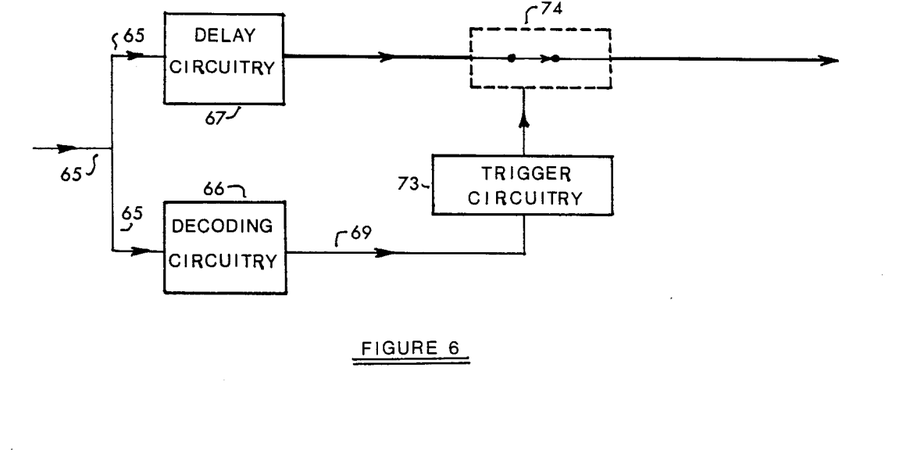
FIG. 6, a block diagram showing details of a second embodiment of the signal divider circuitry.

FIG. 6 shows an alternate embodiment of the signal divider circuitry of the invention. The circuit components common to this circuitry as well as that of FIG. 5 are numbered similarly to FIG. 5. Thus, the signals from the speakerphone circuitry are directed by line 65 to the same decoding circuitry 66 and delay circuitry 67. The output of decoding circuitry 66 is the same as described for FIG. 5. The signals on line 68 are sent to the control signal receiver and control means, with no other connections. The valid tone line 69 is connected as in FIG. 5.

As illustrated in FIG. 6, the output of the delay circuitry is connected through a controllable switch 74 to the amplifier. There are no filters as in FIG. 5. The controllable switch may be a mechanical switch such as a reed relay or other relay or a solid state switch such as a field effect transistor. In this embodiment, the signal from the trigger circuitry 73 opens switch 74 to thereby disconnect the signal to the amplifier.

Figure 7:
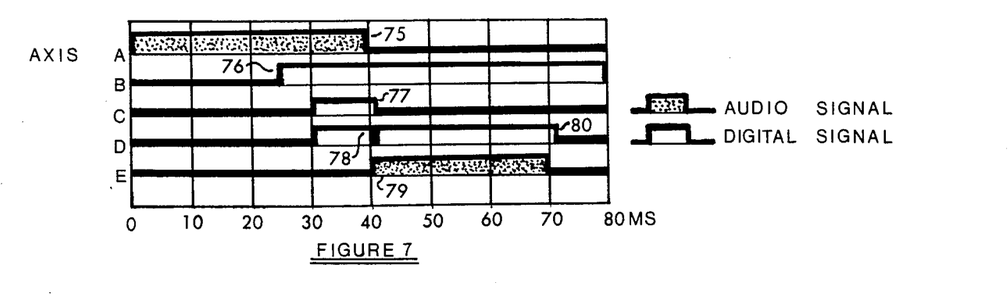
FIG. 7, a timing diagram for the circuity of FIG. 6.
Figure 8:
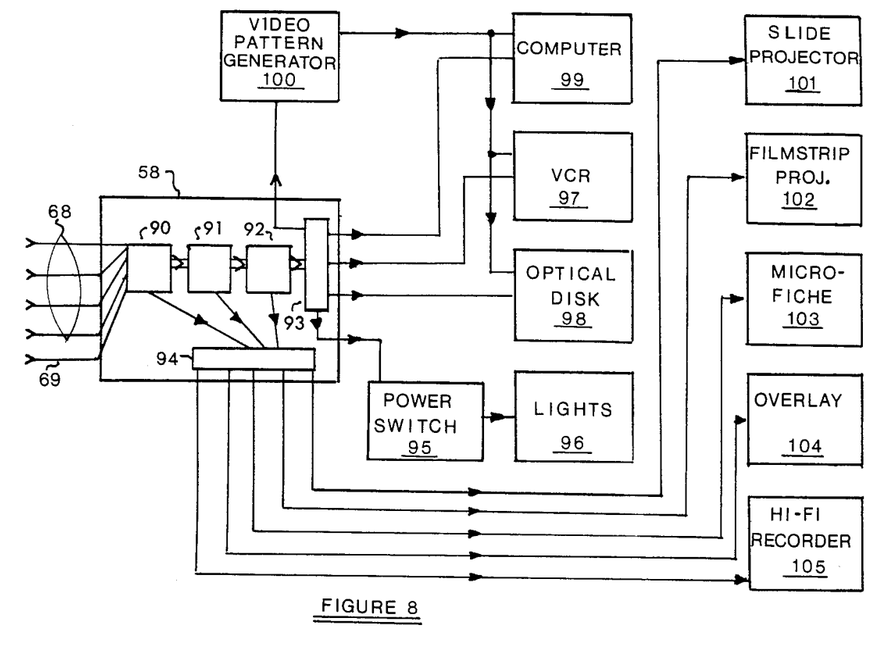
FIG. 8, a block diagram of the control signal receiver and control means along with blocks representing alternative presenting devices.

FIG. 7 is a timing diagram showing operation of the circuitry of FIG. 6. In normal operation, switch 74 is closed and audio signals on line 65 pass through delay circuitry 67 and normally closed switch 74 to the amplifier. Axis A of FIG. 7 represents the signals on line 65. When a control signal represented by the signal 75 appears on line 65 it passes through decoding circuitry 66 which produces a decoded output on lines 68 about twenty-five milliseconds later, which is held until the next control tone signal is received and decoded. This output is shown as signal 76 on axis B. About five milliseconds later (thirty milliseconds from the start of tone signal 75) a valid tone output is produced on line 69. This output is shown as pulse 77 on axis C. Immediately upon the signal appearing on the valid tone line 69, trigger circuitry 73 produces an output signal to switch 74, which causes switch 74 to open. This output is represented by pulse 78 on axis D. At this point thirty milliseconds have elapsed, the tone has been detected and analyzed, but no tone output to the listener has been made since the tone has not yet passed through the delay circuitry. The signal has been moving through the delay circuitry and emerges from that circuitry forty milliseconds after the start of the tone as shown by tone signal 79 on axis E. Since switch 74 is open, the tone is not sent on to the amplifier so is not heard by the audience. When the tone ends, the pulse on the valid tone line to trigger circuitry 73 (pulse 77) also ends. However, it will be seen that the signal from the delay circuitry 67 has not yet stopped. Thus, as indicated above, the trigger circuitry has a built in delay so that the output pulse from the trigger circuitry remains for an additional forty milliseconds to ensure that the tone signal for the delay circuitry has ended prior to allowing the switch 79 to close and reconnect the signals from the delay circuitry to the amplifier. This additional extension of the trigger pulse is shown as 80 on axis D.

Thus, the control signal does not appear on the output of the switch to the amplifier which is shown along axis F.

The disadvantage of the circuitry of FIG. 6 as compared to that of FIG. 5 is its total suppression of all signals, while its advantage is simplicity, and absolute quiet rather than only specific frequency supression. Since in most instances the presentor will not be generating control signals at the same time he is speaking, the circuitry of FIG. 6 will generally operate the system satisfactorily.

FIG. 7 illustrates in block form a number of possible presenting devices that can be controlled with the invention. The decoded control signals enter the control signal receiver and control means 58 on lines 68 as explained above and the valid tone signal enters on line 69. The control signal decoders 90, 91, and 92 in this preferred embodiment are designed to receive three sequential DTMF tones which are clocked in to the signal decoders 90, 91, and 92 by three successive valid tone signals on line 69. Each of these decoders may be a series of four flip flops. At the conclusion of the third valid tone signal, decoder logic circuits 93 and 94 read the state of each of the flip flops and provide a machine readable number or logic output which may be read by any presenting device such as VCR 97, optical disc player 98, or computer 99, in a standard parallel interface such as a Centronics parallel interface. Such decoding techniques are well known in the art. Alternatively, the control signals on lines 68 may be converted to sequential transmission and decoded within the presenting device using an RS-232 or other standard format. The purpose of circuit 58 is to allow a virtually infinite variety of information to be accessed at the receiving end to provide interactive instruction in many different media. For example, an output of circuit 93 may be connected to room power switch 95 for controlling lights 96 at the remote location. By this means, the presentor can provide a complete teaching environment for remote classrooms, by controlling lights for the room.

Circuit 93 may also provide operating commands to VCR 97, optical disc player 98, and computer 99. These may be controlled by sending sequential control characters from circuit 93 to select and present the desired portions of visual media stored in such presenting devices. This type of operation is particularly advantageous in instructional situations where questions from the remote audience can be visually answered by the instructor with small "clips" of information showing the correct procedure for the students to follow. By using appropriate media for storage, literally thousands of instructional "what if's" can be called out of memory to assist the students.

Figure 9:
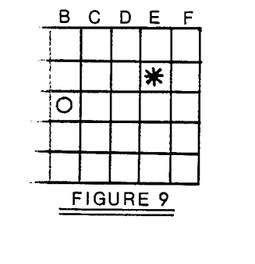
FIG. 9, a representation of one embodiment of a reference grid for use with the invention.

A standard electronic video pattern generator 100 can be attached to any of the above video devices to provide an "overlay" on the output screen to effectively provide a "pointer" to reference material on the screen. A simple on-off command is all that is necessary to impose an overlay of any desired type on the output screen. FIG. 9 shows a sample of such an overlay that can be generated and areas of the screen can be specified by referring to coordinates such as the asterisk(*) at location "E2" and the circle at "B3".

For the lowest cost presentations, or for highest resolution color presentations, a simple slide projector 101 may be used as well as other optical devices such as a filmstrip projector 102 and microfiche projector 103. A second conventional slide projector 104 aligned with the first projector 101 and having an "overlay" slide which projects a grid such as shown in FIG. 9 may be used for referencing portions of a projected slide.

Where the supporting material includes high fidelity sound recordings, such as might be used in music history or appreciation programs, an audio tape player 105 may be operated as the preventing device.

The actual circuitry and controllers for the individual presenting devices may vary considerably, but are well known, and the specific output signals of logic circuits 93 and 94 will be designed for or set for the specific presenting device used. Alternately, logic circuits 93 and 94 will be set to provide parallel alternate outputs set to operate the most common control circuits and controllers normally found or used with common presenting devices so that the presenting device or devices are used with common presenting devices so that the presenting device or devices are merely connected to the appropriate outputs.

While the invention has been specifically described with respect to an originating location and a remote location, it should be realized that a presentation could be given simultaneously to several remote locations using a standard conference call. In addition, while the invention has been described with the audio and control signals transmitted over a single telephone line so that separation of the same two signals at the remote location is desireable, separate telephone lines could be used simultaneously for the audio presentation and for the control signal. Also, while dual tone multifrequency (DTMF), signals have been described as the control signals, and are currently preferred because DTMF generators and decoders are readily available, other types of control signals could be used. The only requirement for such signals is that they be of a type that can be accurately transmitted over voice grade telephone lines.

An important feature of the invention is the use of standard telephone service to make a presentation at a remote location and to control the presentation of quality supporting material at the remote location to simulate a live presentation with the presentor actually at the remote location. It should be realized that while apparatus has been described in detail, the invention also comprehends the method of preparing supporting material for a presentation prior to the presentation, sending the supporting material to the remote location for the presentation in advance of the presentation, making the presentation via standard voice grade telephone service, and controlling presentation of the supporting material during the presentation also via standard telephone service.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A teleconferencing and teaching system, enabling the live presentation of a program with supporting material from an originating location to at least one remote location being connected to the originating location by standard voice grade telephone service, comprising a device for presenting supporting material for the presentation located at the at least one remote location; a package of supporting material for the presentation prepared and supplied in advance of the presentation to the at least one remote location and adapted to be presented by said presenting device; means at the originating location for producing signals representative of the audio presentation made at the originating location and for transmitting such signals by a single line of the standard telephone service to the at least one remote location; means at the originating location for producing control signals representative of the desired operation of the presenting device and for transmitting such signals during the presentation by the same single line of the standard telephone service to the at least one remote location; means at the at least one remote location for receiving the signals from the single telephone line; means in series with the means for receiving signals from the telephone line for decoding the control signals and for determining when control signals are present; amplifier means for amplyifing signals fed to it; delay means electrically in parallel with the decoding means and in series with the amplifying means to delay the signals through the delay means a period of time at least equal to the time required for the decoding means to determine when a control signal is present; blocking means electrically in series between the delay means and the amplifier means and operative in response to a determination by the decoding means that a control signal is present to block transmission of the control signal to the amplifier means; speaker means for converting signals from the amplifier means to audio sound that can be heard at such at least one remote location; means at the at least one remote location for receiving the signals representative of the desired operation of the presenting device and for operating the device during the presentation in response to said signals.

2. A teleconferencing and teaching system according to claim 1, wherein the means at the originating location for producing signals representative of the audio presentation made at the originating location and for transmitting such signals by the standard telephone service is a standard telephone.

3. A teleconferencing and teaching system according to claim 2, wherein the means at the originating location for producing control signals is a DTMF tone generator.

4. A teleconferencing and teaching system according to claim 3, wherein the DTMF tone generator includes a DTMF tone signal generator and a transducer electrically connected to but spaced from the signal generator which produces audio tones in response to the tone signals generated by the tone signal generator, and wherein the transducer is positioned adjacent the handset microphone of the standard telephone.

5. A teleconferencing and teaching system according to claim 4, wherein means is provided to hold the transducer in place adjacent the handset microphone of the standard telephone but spaced from the microphone a sufficient distance to not block other sounds from the microphone to thereby allow the microphone to pick up both sounds generated by the transducer and sounds directed toward the microphone by other sources.

6. A teleconferencing and teaching system according to claim 5, wherein the means for holding the transducer adjacent the microphone is a strap which extends about the back of the microphone portion of the handset to hold the transducer in place and a ring positioned between the transducer and the microphone to space the transducer from the microphone.

7. A teleconferencing and teaching system according to claim 2, wherein the standard telephone is a "touch-tone" telephone and the means for producing control signals is the DTMF generator included as part of said telephone.

8. A teleconferencing and teaching system according to claim 1, wherein the means for receiving the signals from the telephone service is standard telephone circuitry.

9. A teleconferencing and teaching system according to claim 1, wherein the blocking means is a controllable switch which blocks all signal transmission from the delay means to the amplifier means during the duration of the control signal.

10. A teleconferencing and teaching system according to claim 1, wherein the blocking means is filter means controlable to block transmission of the particular control signal between the delay means and the amplifier means for the duration of such control signal.

11. A teleconferencing and teaching system according to claim 10, wherein the control signals are DTMF signals and wherein the filter means include two programmable notch filters and means to program such filters in response to a received control signal so that together the filters remove the control signal from the signal passing between the delay means and the amplifier.

12. A teleconferencing and teaching system according to claim 1, wherein the means for receiving the control signals and for operating the presenting device includes means for operating the lighting at the remote location.

13. A teleconferencing and teaching system according to claim 1, wherein the means at the originating location for producing signals representative of the audio presentation made at the originating location and for transmitting such signals by the standard telephone service to at least one remote location and the means at the at least one remote location for receiving the signals representative of the audio presentation and converting such signals to audio sound that can be heard at such at least one remote location also provide for producing signals representative of audio questions and comments made at the at least one remote location and for transmitting such signals by the standard telephone service to the originating location and for receiving such signals at the originating location and converting such signal to audio sound that can be heard at the originating location.

14. A method of giving a presentation from an originating location to at least one remote location wherein supporting material is to be used during the presentation, comprising the steps of preparing the supporting material for the presentation in advance of the presentation; sending the supporting material to the at least one remote location prior to the presentation; making the presentation from the originating location using standard telephone service between the originating location and the at least one remote location; and controlling presentation of the supporting material during the presentation by sending control signals to the remote location also using standard telephone service.

15. A method according to claim 14, including the additional step of accepting and answering comments from the remote location during the presentation using the standard telephone service between the originating location and the at least one remote location.

16. A method according to claim 14, including the additional steps of preparing a duplicate of the supporting material, and controlling presentation of the duplicate supporting material at the originating location by the same control signals used to control presentation of the supporting material at the remote location.

17. A method according to claim 14, including the additional steps of preparing a duplicate of the supporting material, and controlling presentation of the duplicate supporting material at the originating location by feedback control signals generated at the remote location in response to the control signals sent from the originating location to the remote location, such feedback control signals being sent from the remote location to the originating location.

18. A teleconferencing and teaching system, enabling the live presentation of a program with supporting material from an originating location to at least one remote location being connected to the originating location by standard voice grade telephone service, comprising a device for presenting supporting material for the presentation located at the at least one remote location; a similar device for presenting supporting material for the presentation located at the originating location; separate similar packages of supporting material for the presentation prepared and supplied in advance of the presentation to the at least one remote location and to the originating location and adapted to be presented by said presenting devices; means at the originating location for producing signals representative of the audio presentation made at the originating location and for transmitting such signals by the standard telephone service to the at least one remote location; means at the originating location for producing control signals representative of the desired operation of the presenting devices and for transmitting such signals during the presentation by the stardard telephone service to the at least one remote location; means at the at least one remote location for receiving the signals representative of the audio presentation and converting such signals to audio sound that can be heard at such at least one remote location; means at the originating location and at the at least one remote location for receiving the signals representative of the desired operation of the presenting devices and for operating the devices similarly during the presentation in response to said signals.

19. A teleconferencing and teaching system, enabling the live presentation of a program with supporting material from an originating location to at least one remote location being connected to the originating location by standard voice grade telephone service, comprising a device for presenting supporting material for the presentation located at the at least one remote location; a similar device for presenting supporting material for the presentation located at the originating location; separate similar packages of supporting material for the presentation prepared and supplied in advance of the presentation to the at least one remote location and to the originating location and adapted to be presented by said presenting devices; means at the originating location for producing signals representative of the audio presentation made at the originating location and for transmitting such signals by the standard telephone service to the at least one remote location; means at the originating location for producing control signals representative of the desired operation of the presenting device and for transmitting such signals during the presentation by the stardard telephone service to the at least one remote location; means at the at least one remote location for receiving the signals representative of the audio presentation and converting such signals to audio sound that can be heard at such at least one remote location; means at the at least one remote location for receiving the signals representative of the desired operation of the presenting device and for operating the device during the presentation in response to said signals; feedback means at one of the at least one remote locations for modifying the control signals to generate feedback control signals and for transmitting such feedback control signals to the originating location; means at the originating location to receive said feedback control signals and to operate the presenting device at the originating location in response to said feedback control signals so that the presenting means at both the originating and at least one remote locations operate similarly.

20. A teleconferencing and teaching system, enabling the live presentation of a program with supporting visual material from an originating location to at least one remote location being connected to the originating location by standard voice grade telephone service, comprising a first projection device for presenting supporting visual material for the presentation located at the at least one remote location; a package of supporting material for the presentation prepared and supplied in advance of the presentation to the at least one remote location and adapted to be presented by said first projection device; a second projection device for projecting an overlay on the visual images projected by the first projection device to create a reference grid on such visual images for reference purposes; means at the originating location for producing signals representative of the audio presentation made at the originating location and for transmitting such signals by the standard telephone service to the at least one remote location; means at the originating location for producing control signals representative of the desired operation of the first and second projecting devices and for transmitting such signals during the presentation by the standard telephone service to the at least one remote location; means at the at least one remote location for receiving the signals representative of the audio presentation and converting such signals to audio sound that can be heard at such at least one remote location; and means at the at least one remote location for receiving the signals representative of the desired operation of the first and second projection devices and for operating the devices during the presentation in response to said signals.

* * * * *